US011081003B2

(12) United States Patent
Kurihara et al.

(10) Patent No.: US 11,081,003 B2
(45) Date of Patent: Aug. 3, 2021

(54) MAP-PROVIDING SERVER AND MAP-PROVIDING METHOD

(71) Applicant: HONDA MOTOR CO., LTD., Tokyo (JP)

(72) Inventors: Tadashi Kurihara, Tokyo (JP); Minoru Fukumori, Tokyo (JP); Yoshiaki Sugimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/975,943

(22) PCT Filed: Feb. 19, 2019

(86) PCT No.: PCT/JP2019/006022
§ 371 (c)(1),
(2) Date: Aug. 26, 2020

(87) PCT Pub. No.: WO2019/181328
PCT Pub. Date: Sep. 26, 2019

(65) Prior Publication Data
US 2020/0410859 A1 Dec. 31, 2020

(30) Foreign Application Priority Data

Mar. 19, 2018 (JP) .............................. JP2018-051252

(51) Int. Cl.
*G08G 1/13* (2006.01)
*G08G 1/16* (2006.01)
(52) U.S. Cl.
CPC ................ *G08G 1/13* (2013.01); *G08G 1/16* (2013.01)
(58) Field of Classification Search
CPC .... G08G 1/0112; G08G 1/012; G08G 1/0129; G08G 1/0141; G08G 1/017;
(Continued)

(56) References Cited

U.S. PATENT DOCUMENTS

| 2007/0040705 A1* | 2/2007 | Yoshioka | G08G 1/0969 |
| | | | 340/988 |
| 2010/0063729 A1* | 3/2010 | Goto | G01C 21/26 |
| | | | 701/533 |

(Continued)

FOREIGN PATENT DOCUMENTS

| JP | 2003-123185 | 4/2003 |
| JP | 5805128 | 9/2015 |
| JP | 2016-133844 | 7/2016 |

OTHER PUBLICATIONS

International Search Report, dated Apr. 16, 2019 (Apr. 16, 2019), 1 page.

*Primary Examiner* — Sisay Yacob
(74) *Attorney, Agent, or Firm* — Rankin, Hill & Clark LLP

(57) ABSTRACT

A map-providing server includes: a travel information database creation unit that receives position information of a vehicle and vehicle brake application information; a place of residence estimation unit that estimates the position of the place of residence of a vehicle; a sudden braking location identification unit that identifies a location of the occurrence of vehicle sudden braking from information from the travel information database creation unit; a unit for determining the cause of sudden braking, which determines whether the location where sudden braking has occurred locally, at a position within a predetermined range from the position of the place of residence of the user of the vehicle; and a unit for recording sudden braking information that records, on map information, the location where sudden braking has occurred, in association with information indicating whether the vehicle user is a local resident.

5 Claims, 9 Drawing Sheets

(58) Field of Classification Search
CPC ....... G08G 1/096716; G08G 1/096741; G08G 1/096775; G08G 1/096811; G08G 1/096844; G08G 1/0969; G08G 1/13; G08G 1/16; G09B 29/00; G09B 29/10
See application file for complete search history.

(56) References Cited

U.S. PATENT DOCUMENTS

| | | | |
|---|---|---|---|
| 2011/0153199 A1* | 6/2011 | Morimoto | G08G 1/096805 701/533 |
| 2016/0049075 A1* | 2/2016 | Sato | G01C 21/3461 340/905 |
| 2017/0292842 A1* | 10/2017 | Kondo | G09B 29/106 |

* cited by examiner

FIG. 6

322: TRAVEL INFORMATION DATABASE

| MOVING BODY ID | VISITING FACILITY | DEPARTURE POSITION | TRAVEL INFORMATION | SUDDEN BRAKING INFORMATION |
|---|---|---|---|---|
| abc123 | AAA | ... | ... | ... |
|  | AAA | ... | ... | ... |
|  | CCC | ... | ... | ... |
|  | ... | ... | ... | ... |
| efg456 | AAA | ... | ... | ... |
|  | BBB | ... | ... | ... |
|  | CCC | ... | ... | ... |
|  | ... | ... | ... | ... |
|  | YYY | ... | ... | ... |
| ... | ... | ... | ... | ... |
| xyz789 | DDD | ... | ... | ... |
|  | DDD | ... | ... | ... |
|  | DDD | ... | ... | ... |
|  | ... | ... | ... | ... |

MAP-PROVIDING SERVER AND MAP-PROVIDING METHOD

TECHNICAL FIELD

The present invention relates to a map providing server and a map providing method for providing a map enabling easy understanding of whether sudden braking at a place where the sudden braking occurs is caused by local residents or non-local residents.

BACKGROUND ART

Electronic maps have come to be used in various forms accompanying the development of information processing technology in recent years. For example, in addition to a tourist map or a gourmet map in which tourist places, restaurants, and the like are arranged on a map, a traffic safety map or the like for educating traffic safety by showing many places where traffic accidents occur is widely used.

However, with traffic safety maps, it has been demanded to show high-risk locations on the map in order to educate traffic safety to local residents. In this regard, in the past, high-risk areas have been collected based on traffic accident information managed by the police, the results of questionnaires from local residents, and the like. Furthermore, Japanese Unexamined Patent Application, Publication No. 2003-123185 describes a danger information collection and distribution device that collects a travel state such as sudden steering or sudden braking from a travel automobile and accumulates it in a server to collect places that are highly dangerous for an automobile user. Furthermore, Japanese Patent No. 5805128 discloses a technique of specifying a dangerous place in a town based on sudden braking information from vehicles or the like, and making use of the information so that the reason can be posted to the dangerous place specified by a general user. However, from the viewpoint of town development, it is necessary to take countermeasures at dangerous places, and in such a case, it is necessary to understand, for example, what kind of vehicles are causing sudden braking; however, it has not been possible to handle this with the conventional technology.

Patent Document 1: Japanese Unexamined Patent Application, Publication No. 2003-123185
Patent Document 2: Japanese Patent No. 5805128

DISCLOSURE OF THE INVENTION

Problems to be Solved by the Invention

From the viewpoint of town development, it is necessary to take countermeasures on dangerous places; however, when considering countermeasures on dangerous places, for example, it is necessary to understand what kind of vehicle is causing sudden braking. In this regard, when traffic accident information and the like managed by the police are used, it only indicates the place where a traffic accident has already occurred, and it has not been possible to indicate a potentially dangerous place. Additionally, at locations at which traffic accidents repeatedly occur, countermeasures are often already being conducted such as the installation of curve mirrors and traffic lights, and thus there has also been a problem in lacking a real-time property. In addition, when collecting high-risk areas based on the results of questionnaires from local residents, for example, when people other than local residents (also referred to as "non-local residents") drive in towns that are not local for them, for example, people who are non-local residents cannot understand where they feel dangerous and where they are applying sudden braking in towns that are not local for them. That is, according to the techniques described in Japanese Unexamined Patent Application, Publication No. 2003-123185 and Japanese Patent No. 5805128, for example, it has not been possible to understand which vehicles caused the sudden braking at the place where the sudden braking occurred, for example, by local residents familiar with the town or by non-local residents unfamiliar with the town, for taking countermeasures according to the situation.

The present invention has been made in view of such problems, and an object of the present invention is to provide a map providing server and a map providing method which make it easy for a viewer to clarify the cause and plan a countermeasure by estimating the place of residence of a moving body based on the travel history of the moving body and thereafter separately displaying whether the sudden braking location on the map is caused by a local resident who resides within the place-of-residence range or by a non-local resident who resides outside the place-of-residence range.

Means for Solving the Problems

A map providing server (for example, a map providing server 30 described later) according to the first aspect of the present invention includes: a receiving unit (for example, "the travel information database creating unit 311" described later) that receives positional information and information relating to braking of a moving body; a map information storage unit (for example, "the storage unit 32" described later) that stores map information storing information of roads on which the moving body can travel; a place of residence estimating unit (for example, "the place-of-residence estimating unit 312" described later) that estimates a position of a place of residence including any one of a home, a workplace, and a school of a user of the moving body based on an estimation of the positional information of the moving body; a sudden braking location specifying unit (for example, "the sudden braking location specifying unit 313" described later) that specifies a sudden braking occurrence of the moving body and an occurrence location of the sudden braking based on the information of the receiving unit; a sudden braking cause specifying unit (for example, "the sudden braking cause specifying unit 314" described later) that determines whether the occurrence location of the sudden braking is located within a predetermined range set in advance from the position of the place of residence of the user of the moving body, or located outside the predetermined range; and a sudden braking information recording unit (for example, "the sudden braking information recording unit 315" described later) that records the occurrence location of the sudden braking in the map information in association with local/non-local information indicating whether the position of the place of residence of the user of the moving body specified by the sudden braking cause specifying unit is located within the predetermined range or located outside the predetermined range.

According to the first aspect, since what kind of vehicle is causing the sudden braking at the place where the sudden braking occurred, for example, by a local resident familiar with the town or by a non-local resident unfamiliar with the town, is stored in association with each other, it is possible to analyze the place where the sudden braking occurs from the viewpoint of the local resident or the non-local resident.

According to the second aspect, the map providing server (for example, a map providing server 30 described later) according to the first aspect may further include a map creating unit (for example, "the sudden braking map creating unit 316" described later) that, in response to a map display request from a terminal (for example, "the user terminal 40" described later) connected to enable communication with the map providing server, arranges the occurrence location of the sudden braking on a map, and provides the local/non-local information to the terminal in a displayable manner in association with the occurrence location of the sudden braking.

According to the second aspect, it is possible to easily understand from the terminal whether the sudden braking at the place where the sudden braking occurred is caused mainly by a local resident or by a non-local resident.

According to the third aspect, the map providing server (for example, a map providing server 30 described later) according to the first aspect or the second aspect may further include a route information calculating unit (for example, "the route information calculating unit 317" that, in response to a route guidance request from the moving body, calculates route information that bypasses the occurrence location of the sudden braking based on whether the position of the user of the place of residence of the moving body is located within the predetermined range of the occurrence location of the sudden braking recorded in the map information by the sudden braking information recording unit (for example, "the sudden braking information recording unit 315", or located outside the predetermined range.

According to the third aspect, in a case in which the moving body user is a non-local resident, when the sudden braking is mainly caused by the non-local resident at the place where the sudden braking occurred, route guidance for bypassing the sudden braking can be provided to the non-local resident, and when the sudden braking is mainly caused by the local resident at the place where the sudden braking occurred, route guidance for bypassing the sudden braking can be provided to the local resident. Therefore, it is possible to perform route guidance for avoiding the dangerous places regardless of whether the moving body user is a local resident or a non-local resident.

According to the fourth aspect, a map providing method performed by one or more computers including a map information storage unit that stores map information storing information of roads on which a moving body can travel, includes the steps of: receiving positional information and information relating to braking of the moving body; estimating a position of a place of residence including one of a home, a workplace, and a school of a user of the moving body based on an estimation of the positional information of the moving body; specifying a sudden braking occurrence of the moving body and an occurrence location of the sudden braking based on the information received in the step of receiving; determining whether the occurrence location of the sudden braking is located within a predetermined range set in advance from the position of the place of residence of the user of the moving body, or located outside the predetermined range; and recording the occurrence location of the sudden braking in the map information in association with information indicating whether the position of the place of residence of the user of the moving body specified in the step of determining is located within the predetermined range or located outside the predetermined range.

According to the above method of the fourth aspect, the same effect as that of the map providing server of the first aspect is obtained.

Effects of the Invention

According to the present invention, it is possible to provide a map providing server and a map providing method which make it easy for a viewer (e.g., a planner of town development, a planner of traffic safety measures, etc.) to clarify the cause and plan a countermeasure by estimating the place of residence of the moving body based on the travel history of the moving body, and thereafter separately displaying whether the sudden braking point on the map is caused by a local resident who resides within the place-of-residence range or by a non-local resident who resides outside the place-of-residence range.

BRIEF DESCRIPTION OF THE DRAWINGS

FIG. 6 is a table showing an example of a travel information database according to an embodiment of the present invention;

PREFERRED MODE FOR CARRYING OUT THE INVENTION

Hereinafter, a preferred embodiment of a map providing system of the present invention will be described in detail with reference to the drawings.

<Entire Configuration of Map Providing System 1>

Figure 1:
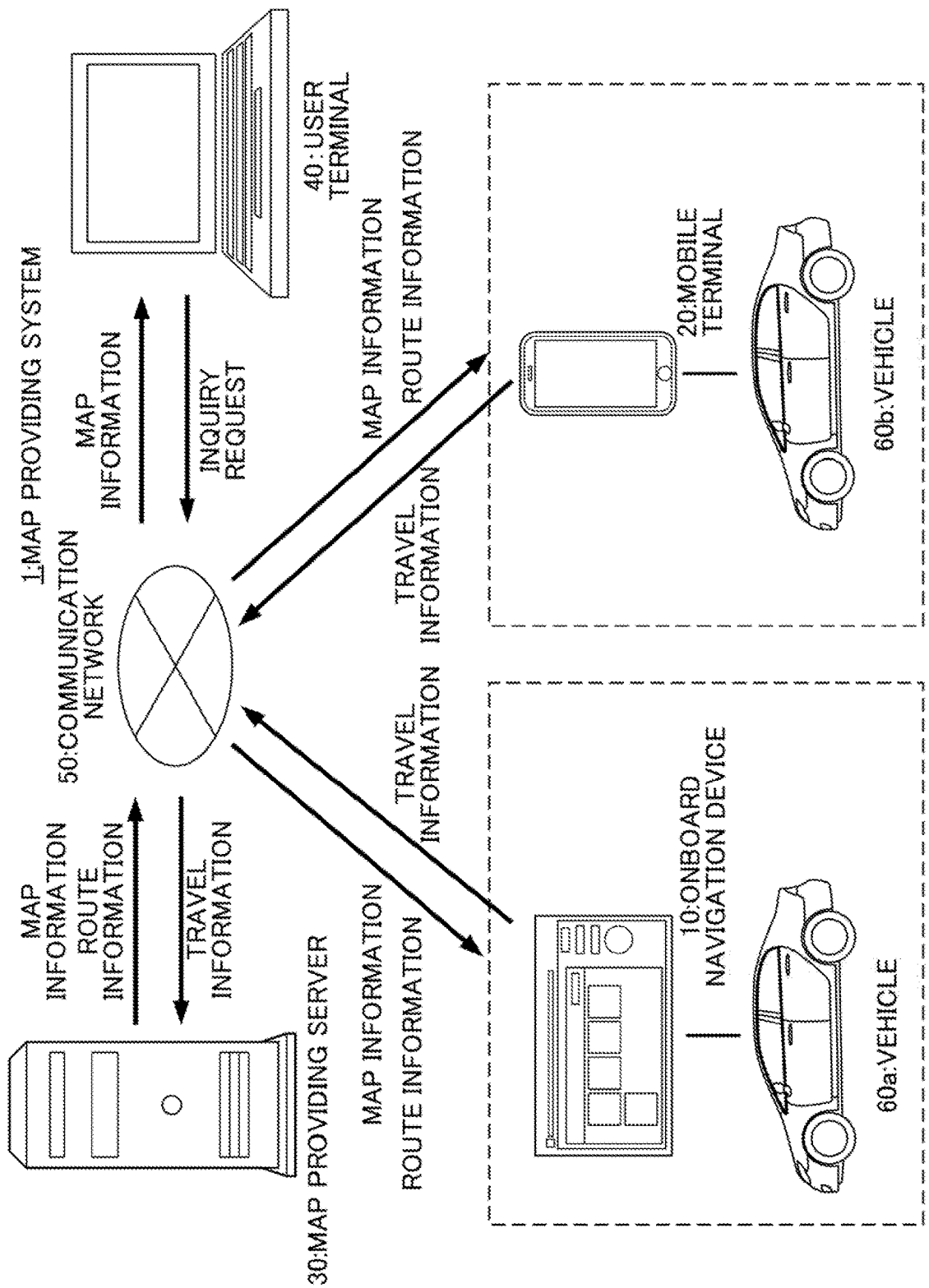
FIG. 1 is a block diagram showing the basic configuration of an entire map providing system according to an embodiment of the present invention.

A map providing system 1 according to a preferred embodiment of the present invention will be described. FIG. 1 shows the overall configuration of the map providing system 1.

As shown in FIG. 1, the map providing system 1 includes an onboard navigation device 10, a mobile terminal 20, a map providing server 30, and a user terminal 40. Each device and each terminal are connected to enable communication with each other through a communication network 50. Furthermore, in the drawings, information to be transmitted and received with respect to each device and each terminal is illustrated. However, such information is merely an example. In the present embodiment, information other than the illustrated information may be transmitted and received.

The onboard navigation device 10 is a device performing navigation (route guidance) with respect to a user in a vehicle 60a. The onboard navigation device 10 performs the route guidance from a current position to a destination based on the request from the user. In addition, the onboard navigation device 10 also has a function of positioning positional information of the onboard navigation device 10 (that is, positional information of the vehicle 60a). The positional information measured by the onboard navigation device 10 is appropriately transmitted to the map providing server 30. The onboard navigation device 10 can be realized by a transportable car navigation device fixed to the vehicle 60a which is a moving body, or a portable navigation device (PND) simply disposed in the vehicle 60a which is a moving body.

The mobile terminal 20 is a mobile terminal used by a user in a vehicle 60b. As with the onboard navigation device 10 described above, the mobile terminal 20 has a function of measuring the positional information of the mobile terminal 20 (that is, positional information of the vehicle 60b). The positional information measured by the mobile terminal 20 is appropriately transmitted to the map providing server 30 in the same manner as the positional information positioned by the onboard navigation device 10. The mobile terminal 20 can be realized by a smartphone, a mobile phone, a tablet terminal, a laptop computer, and other portable electronic devices.

It should be noted that, in the drawing, a combination of the onboard navigation device 10 and the vehicle 60a, and a combination of the mobile terminal 20 and the vehicle 60b are illustrated one by one. However, the number of such combinations is not particularly limited. Furthermore, in the following description, in a case in which the vehicle 60a in which the onboard navigation device 10 is mounted and the vehicle 60b to be ridden by the user using the mobile terminal 20 are collectively referred to without distinguishing them, the suffix of the alphabet of the reference numeral of them is omitted, and simply referred to as "vehicle 60". Furthermore, the vehicle 60a in which the onboard navigation device 10 is mounted and the vehicle 60b to be ridden by the user using the mobile terminal 20 are also collectively referred to as a "moving body".

When the map providing server 30 receives information relating to braking from a moving body, which is processing specific to the present embodiment, estimates the place of residence of the moving body based on the travel history of the moving body, and thereafter classifies the sudden braking occurrence location by the moving body by whether the sudden braking is caused by a local resident who resides within the place-of-residence range or by a non-local resident who resides outside the place-of-residence range. In so doing, the map providing server, for example, specifies the sudden braking occurrence location where the number of occurrences of the sudden braking at the same location or the frequency of occurrences of the sudden braking exceeds a predetermined threshold value on a map, and also creates map information that is associated with the local/non-local information indicating whether the sudden braking at the location where the sudden braking occurred is caused mainly due to a local resident residing within the place-of-residence range or due to a non-local resident residing outside the place-of-residence range.

In addition, the map providing server 30 makes it possible to inquire from the terminal the sudden braking occurrence location and the map information in which the local/non-local information is associated with the sudden braking occurrence location, and also provides the map information at the time of, for example, creating route information when the moving body performs route guidance. The detailed processing contents of the map providing server 30 will be described later. The map providing server 30 may be realized, for example, by a server comprising one or more computers.

The user terminal 40 is connected to the map providing server 30 so as to be able to communicate with the map providing server 30 and, by requesting the map information in which the sudden braking occurrence locations with which the local/non-local information is associated are arranged on the map providing server 30, acquires the map information in which the sudden braking occurrence locations with which the local/non-local information is associated are arranged, thereby making it possible to display on the display unit 44 the map information in which the sudden braking occurrence locations with which the acquired local/non-local information is associated are arranged.

The communication network 50 is realized by a network such as the internet or a mobile telephone network, or a network made by combining these. In addition, a LAN (Local Area Network) may be included in a part of the network.

The vehicle 60 is a moving body in which the onboard navigation device 10 or the user of the mobile terminal 20 exists. The vehicle 60 is realized by, for example, a four-wheeled vehicle, a motorcycle, a bicycle, or the like.

<Functional Blocks of Onboard Navigation Device 10>

Next, functional blocks of the onboard navigation device 10 will be described with reference to a block diagram of FIG. 2. Here, the onboard navigation device 10 receives the supply of power from the vehicle 60a, and when the user getting in the vehicle 60a turns ON the ignition switch of the vehicle 60a (starts the engine), the onboard navigation device 10 is automatically activated. Thereafter, the onboard navigation device 10 is operated until the user in the vehicle 60a turns off the ignition switch of the vehicle 60a (stops the engine).

Figure 2:
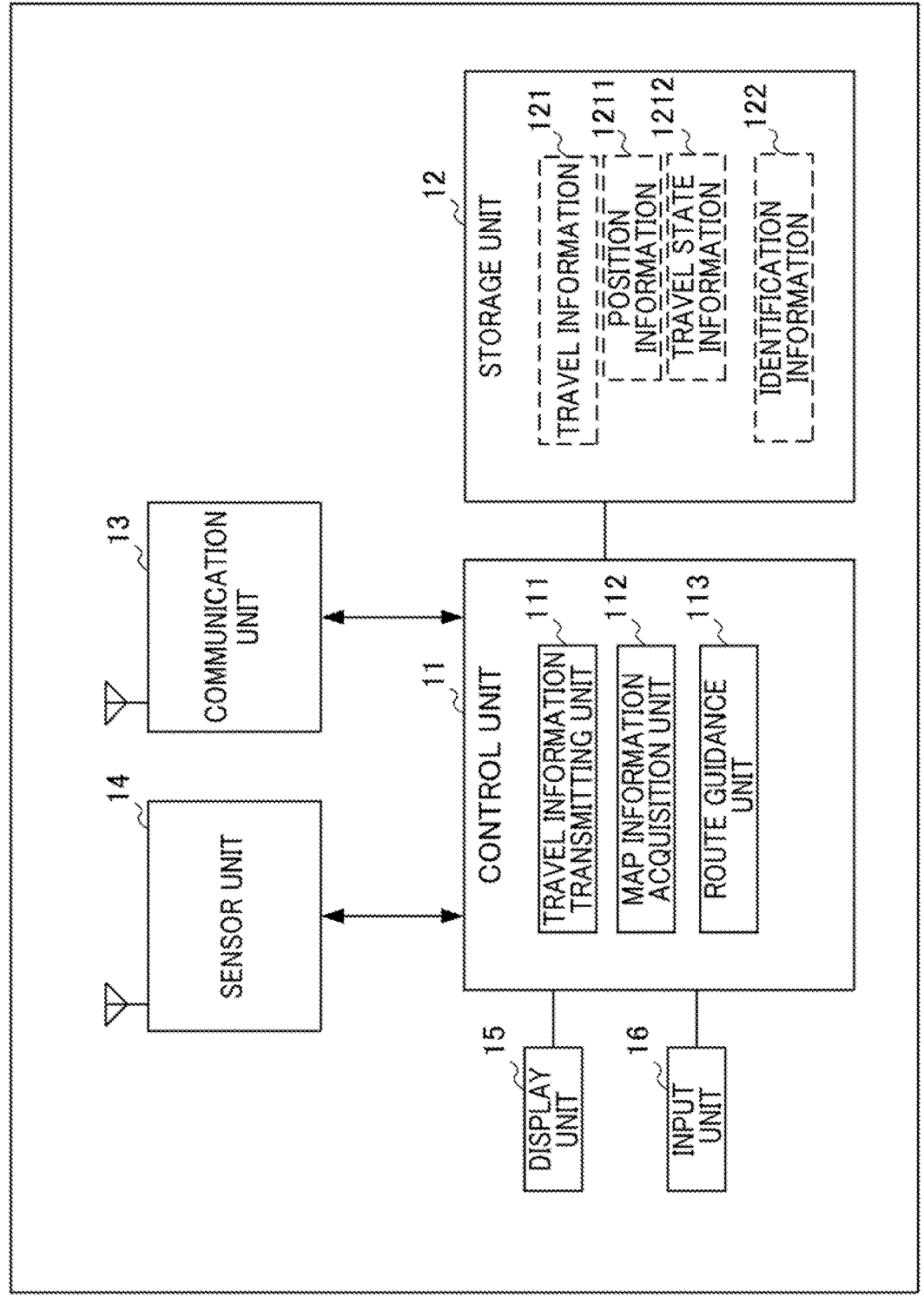
FIG. 2 is a functional block diagram showing the functional configuration of an onboard navigation device according to an embodiment of the present invention.

As illustrated in FIG. 2, the onboard navigation device 10 includes a control unit 11, a storage unit 12, a communication unit 13, a sensor unit 14, a display unit 15, and an input unit 16.

The control unit 11 is composed of an arithmetic processing unit such as a microprocessor and controls each unit constituting the onboard navigation device 10. The details of the control unit 11 will be described below.

The storage unit 12 is configured by semiconductor memory or the like, and stores various types of information such as a control program called firmware or an operating system, a program for performing route guidance processing, a program for performing transmission processing of positional information with respect to the map providing server 30 and travel information including the presence or absence of sudden braking, and other various types of information such as map information. In the drawings, as the information stored in the storage unit 12, travel information 121 and identification information 122 are illustrated which are information particularly related to the transmission processing of the positional information and the travel information including the presence or absence of the sudden braking.

The travel information 121 means information relating to the travel condition of the vehicle 60a including the positional information 1211 of the onboard navigation device 10

(i.e., the positional information of the vehicle 60a) which is positioned by the later-described sensor unit 14 or the like, and the travel state information 1212 including the presence or absence of sudden braking of the vehicle 60a. It should be noted that the positional information 1211 may include not only information indicating the position which is measured but also the time when the positioning is performed. For the travel state information 1212 including the presence or absence of sudden braking, for example, it is possible to detect the occurrence of sudden braking by a brake pedal sensor, an acceleration sensor, or the like (not shown). More specifically, the control unit 11 can detect that the sudden braking occurs when the brake pedal depression amount obtained from the brake pedal sensor suddenly increases, when a sudden deceleration occurs by the acceleration sensor, or the like. Furthermore, by matching with the positional information at the time of detecting the occurrence of the sudden braking, it is possible to specify the occurrence position and the occurrence time of the sudden braking. It should be noted that the travel state information 1212 may include the travel state information other than the presence or absence of the sudden braking (e.g., vehicle speed information, sudden start information, etc.). It should be noted that the travel state information such as the vehicle speed information and the sudden start information is known to those skilled in the art, and a description thereof will be omitted. Furthermore, the identification information 122 is information for identifying the onboard navigation device 10. For example, a production number or the like that is uniquely assigned to the onboard navigation device 10 can be used as the identification information 122. In addition, in order for the communication unit 13 to be connected to the communication network 50 which is a mobile telephone network, etc., a telephone number assigned to a subscriber identity module (SIM) inserted into the communication unit 13 can be used as the identification information 122. In addition, a vehicle identification number (VIN) or the number of a number plate, which is uniquely assigned to the vehicle 60a, can be used as the identification information 122.

The communication unit 13 has a DSP (Digital Signal Processor) or the like, and realizes wireless communication with the other devices via the communication network 50 (e.g., the map-providing server 30) in accordance with standards such as 3G (3rd Generation) LTE (Long Term Evolution) and Wi-Fi (registered trademark). The communication unit 13 is used, for example, for the travel information transmitting unit 111, which will be described later, to transmit the travel information 121 and the identification information 122 stored in the storage unit 12 to the map providing server 30. However, the data transmitted and received between the communication unit 13 and other devices is not particularly limited, and information other than the travel information 121 and the identification information 122 may be transmitted and received.

The sensor unit 14 preferably includes, for example, a GPS (Global Positioning System) sensor, a gyro sensor, an acceleration sensor, a brake pedal sensor, and the like. In that case, the sensor unit 14 includes a function as a position detecting means for detecting the positional information, receives the GPS satellite signal by the GPS sensor, and measures the positional information (latitude and longitude) of the onboard navigation device 10. The positioning by the sensor unit 14 is performed at a predetermined time interval (for example, 3 second interval) as described above. The measured positional information is stored in the storage unit 12 as the positional information 1211. Furthermore, for example, a brake pedal sensor, an acceleration sensor, or the like, as described above, includes a function as a travel state detecting means for detecting a travel state including the presence or absence of sudden braking. It should be noted that, in the sensor unit 14, it is possible to further increase a positioning accuracy of the positional information of the onboard navigation device 10 based on an angular velocity or an acceleration rate that is measured by a gyro sensor or an acceleration sensor. In addition, in a case where GPS communication is difficult to be performed or is not capable of being performed, the sensor unit 14 can use assisted global positioning system (AGPS) communication to calculate the positional information of the onboard navigation device 10 according to base station information acquired from the communication unit 13. It should be noted that the sensor unit 14 is not limited to the configuration including all the sensors described above. For example, some or all of the above-described sensors may be included in an onboard sensor (not shown) mounted in the vehicle 60a. In this case, the control unit 11 may receive signals from the onboard sensors, or may receive information detected by the onboard sensors from the ECU (Electronic Control Unit) of the vehicle 60a.

The display unit 15 is configured by a display device such as a liquid crystal display or an organic electroluminescence panel. The display unit 15 receives an instruction from the control unit 11, and displays an image. Examples of the information displayed on the display unit 15 include, for example, the current position of the onboard navigation device 10, map information in the vicinity of the current position of the onboard navigation device 10, which is read from the map information, a destination set by the user, meeting information notified from the other onboard navigation device 10, route information, various user interfaces, and the like.

The input unit 16 is configured by an input device (not illustrated) such as a physical switch referred to as a numeric keypad or a touch panel that is disposed by being overlaid with a display surface of the display unit 15, and the like. A signal based on an operation input from the input unit 16, such as press of the numeric keypad by the user, or touch of the touch panel, is outputted to the control unit 11, and thus, a selection operation of the user, and a scaling operation of a map can be realized.

It should be noted that, even though it is not illustrated, a speaker, a microphone, or the like can be provided. The speaker outputs sound with respect to a driver, and the microphone collects a sound generated by the driver. With such a configuration, information can be outputted from the speaker as a sound, or various selections or instructions that are inputted by the voice of the driver through the microphone can be inputted into the control unit 11 by sound recognition technology.

Next, the details of the control unit 11 will be described. The control unit 11 is configured by a microprocessor including a central processing unit (CPU), random access memory (RAM), read only memory (ROM), input/output (I/O), and the like. The CPU executes each program read from the ROM or the storage unit 12, reads the information from the RAM, the ROM, and the storage unit 12 when the program is executed, and writes the information in the RAM and the storage unit 12, and thus, performs delivery of the signal with respect to the communication unit 13, the sensor unit 14, the display unit 15, and the input unit 16. Furthermore, the processing of the present embodiment is realized by hardware and software (a program) cooperating with each other in this way.

The control unit 11 includes, as functional blocks, a travel information transmitting unit 111, a map information acquisition unit 112, and a route guidance unit 113.

The travel information transmitting unit 111 is a unit that transmits the travel information 121 and the identification information 122 to the map providing server 30 by wireless communication using the communication unit 13. The travel information transmitting unit 111 periodically transmits the travel information 121 and the identification information 122 to the map providing server 30 until the ignition switch of the vehicle 60a is turned on (the engine is started) by the user riding in the vehicle 60a, following which the onboard navigation device 10 is automatically started, and then the ignition switch of the vehicle 60a is turned off (the engine is stopped). For example, each time the sensor unit 14 performs positioning at a predetermined time interval (e.g., 3 second interval) for the positional information 1211, transmission is performed in real time. In addition, instead of transmitting to the map providing server 30 in real time, a plurality of pieces (for example, the positional information 1211 updated at 3 second intervals in 3 minutes and the identification information 122 may be combined) may be transmitted at a time. That is, so-called burst transmission may be performed. The length of a predetermined time interval, and whether to perform the real-time transmission or the burst transmission can be arbitrarily set in accordance with the environment or the like in which the present embodiment is applied. In this manner, by performing real-time transmission or burst transmission, the travel information transmitting unit 111 can transmit the positional information 1211 for specifying the travel route of the vehicle 60a positioned by the sensor unit 14 and the identification information 122 to the map providing server 30.

In this case, it is possible to transmit the position specified by the positional information 1211 measured immediately after the ignition switch is turned on (the engine is started) and the onboard navigation device 10 is automatically started to the map providing server 30 as the first vehicle position, that is, departure position. Furthermore, it is possible to transmit the position specified by the positional information 1211 measured immediately before the ignition switch is turned off (the engine is stopped) to the map providing server 30 as the final vehicle position, that is, parking position. In this case, information indicating the positional information 1211 representing the departure position or the positional information 1211 representing the stop position (for example, the flag representing these is set to 1) may be added to the positional information 1211, and then transmitted to the map providing server 30. It should be noted that the positional information 1211 (that is, the stop position) that is positioned immediately before the ignition switch is turned off (the engine is stopped) may be transmitted when the ignition switch is turned on (the engine is started), and the onboard navigation device 10 is activated again.

Furthermore, when the occurrence of the sudden braking by the brake pedal sensor or the acceleration sensor or the like is detected, the travel information transmitting unit 111 can transmit time information of the time when the occurrence of the sudden braking was detected. With such a configuration, the map providing server 30 can specify the sudden braking occurrence position by using the positional information of the vehicle 60 at the same time (or at a time close to the same time).

Figure 3:
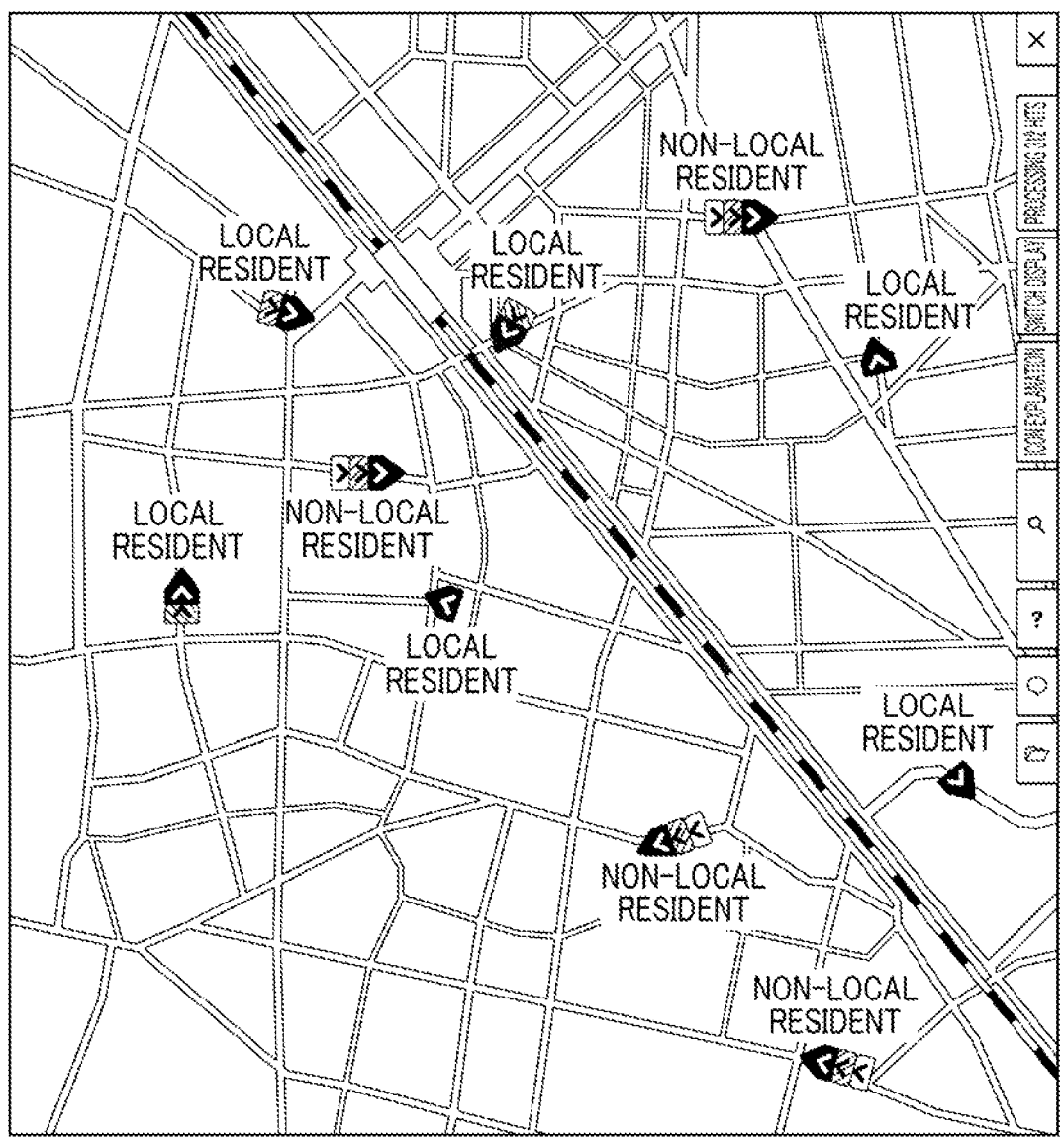
FIG. 3 is an example of displaying the map information where the sudden braking occurrence locations in an embodiment of the present invention are arranged.

The map information acquisition unit 112 can acquire the map information in which the sudden braking occurrence location associated with the local/non-local information is arranged, by requesting the map information in which the sudden braking occurrence location associated with the local/non-local information is arranged with respect to the map providing server 30. The map information acquisition unit 112 can display, on the display unit 15, the map information in which the sudden braking occurrence location associated with the acquired local/non-local information is arranged, for example, as shown in FIG. 3. Here, the number of times the sudden braking occurs is indicated by the number of arrows. That is, the locations indicated by three arrows represent the highest number of sudden braking occurrences, followed by two arrows and then one arrow. The term "local resident" refers mainly to the place where sudden braking is caused by a local resident, and the term "non-local resident" refers mainly to the place where sudden braking is caused by a non-local resident.

The route guidance unit 113 is a portion performing route guidance processing until the destination such as a facility which is inputted or selected by the user. The route guidance processing until the destination is equivalent to the route guidance processing in a general car navigation system. That is, the route guidance unit 113 generates a map until the destination based on the map information (not shown) stored in the storage unit 12, superimposes the current position of the onboard navigation device 10 positioned by the sensor unit 14 on the map, the position of the destination, and the route information to the destination, and displays the superimposed map on the display unit 15, whereby the route guidance unit 113 can perform the route guidance. In this case, sound for route guidance may be further outputted from the speaker (not shown). In addition, information of the road traffic situation, weather information, or the like may be acquired through the communication of the communication unit 13, and the acquired information may be used for the route guidance processing. As will be described later, the onboard navigation device 10 can receive, from the map providing server 30 (route information calculating unit 317), at least route information that bypasses a sudden braking occurrence location where sudden braking has occurred mainly by non-local residents in a case in which the sudden braking occurrence location is located outside the first predetermined range from any user's position of a place of residence of the vehicle 60a, and at least route information that bypasses a sudden braking occurrence location where sudden braking has occurred mainly by local residents in a case in which the sudden braking occurrence location is located within the first predetermined range from any user's position of a place of residence of the vehicle 60a. By doing so, the route guidance unit 113 can provide route guidance that avoids the location of sudden braking by local residents or non-local residents, depending on the case where the moving body user is a local resident or a non-local resident. The configuration of the onboard navigation device 10 has been described above.

<Functional Block of Mobile Terminal 20>

Figure 4:
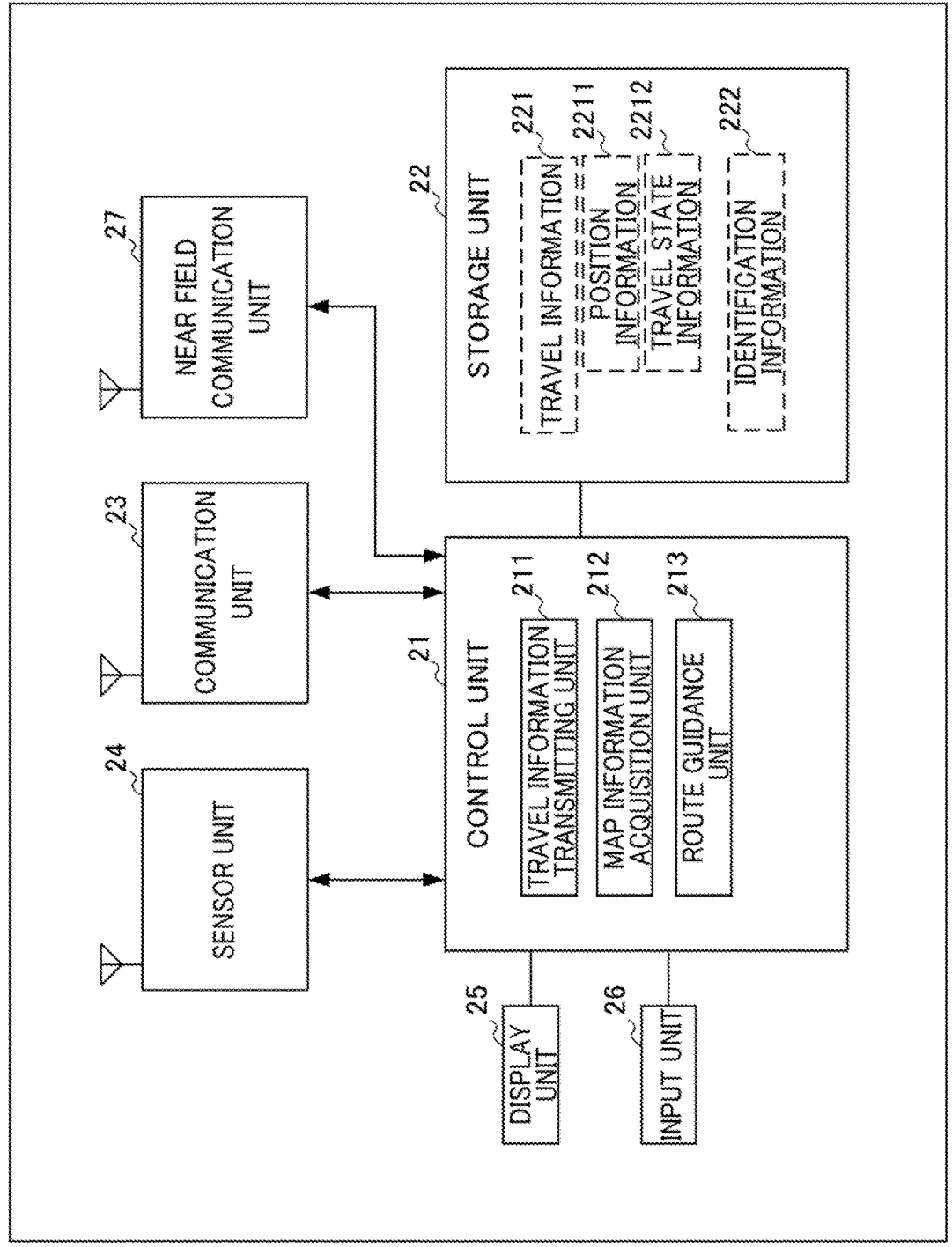
FIG. 4 is a functional block diagram showing the functional configuration of a mobile terminal according to an embodiment of the present invention.

Next, functional blocks of the mobile terminal 20 will be described with reference to the block diagram of FIG. 4. Here, the onboard navigation device 10 described above receives the supply of the power source from the vehicle 60a; however, the mobile terminal 20 receives the supply of power from a battery (not shown) provided therein. However, in order to charge the battery, the mobile terminal 20 may receive the supply of power from a cigarette socket or the like of the vehicle 60b.

As shown in FIG. 3, the mobile terminal 20 includes a control unit 21, a storage unit 22, a communication unit 23, a sensor unit 24, a display unit 25, an input unit 26, and a near field communication unit 27. Here, the control unit 21, the storage unit 22, the communication unit 23, the display unit 25, and the input unit 26 each has the same function as the functional block of the same name included in the onboard navigation device 10 described above. That is, each of the functional blocks of the mobile terminal 20 will be described by replacing the "onboard navigation device 10" in the description of the onboard navigation device 10 described above with the "mobile terminal 20", and thus, redundant descriptions will be omitted. It should be noted that the sensor unit 24 is not limited to a configuration including all the sensors that the sensor unit 14 includes. For example, some or all of the sensors may be included in an onboard sensor (not shown) mounted on the vehicle 60*b*. In that case, the control unit 21 may be adapted to receive a signal from the onboard sensor, or may receive information detected by the onboard sensor from the ECU (Electronic Control Unit) of the vehicle 60*b*.

On the other hand, the mobile terminal 20 is different from the onboard navigation device 10 in that the mobile terminal 20 includes the near field communication unit 27. Therefore, the differences will be described below. The near field communication unit 27 is a portion for performing non-contact near field communication based on a standard such as near field communication (NFC) or Bluetooth (Registered Trademark), or wired near field communication through a universal serial bus (USB) cable or the like. On the other hand, the vehicle 60*b* includes a near field communication unit for performing communication with the near field communication unit 27. For example, the electronic control unit (ECU) of the vehicle 60*b* includes the near field communication unit. Furthermore, a case in which the mobile terminal 20 is capable of performing communication with the ECU through near field communication refers to a case in which the mobile terminal 20 exists in the vehicle 60*b*. In this case, the positional information of the mobile terminal 20 that is measured by the sensor unit 24 corresponds to the positional information of the vehicle 60*b*.

Therefore, the mobile terminal 20 activates the travel information transmitting unit 211 while near field communication with the ECU is possible via the near field communication unit 27. Furthermore, the activated travel information transmitting unit 211 transmits, in the same manner as the travel information transmitting unit 111 of the onboard navigation device 10, the travel route of the vehicle 60*b* positioned by the sensor unit 24, the travel information 221 for specifying the presence or absence of a sudden braking acquired from the vehicle 60*b*, for example, and the identification information 222 to the map providing server 30.

For example, when the user rides in the vehicle 60*b* with the mobile terminal 20 and turns on an activation switch of the vehicle 60*b* such as the ignition switch, the vehicle 60*b* and the mobile terminal 20 are connected (paired) to each other, and travel information 221 and identification information 222 to be positioned by the mobile terminal 20 or acquired from the vehicle 60*b* are transmitted from the mobile terminal 20 to the map providing server 30. In this case, the position specified by the travel information 221 positioned immediately after the pairing between the vehicle 60*b* and the mobile terminal 20 can be transmitted to the map providing server 30 as the first vehicle position, that is, the departure position.

Furthermore, in a case in which the activation switch of the vehicle 60*b*, such as the ignition switch, is turned off, the pairing between the vehicle 60*b* and the mobile terminal 20 is released. In this case, the position specified by the positional information 1211 positioned immediately before the release can be transmitted to the map providing server 30 as the final vehicle position, that is, the parking position. In this case, as with the travel information transmitting unit 111, the real-time transmission may be performed, or the burst transmission may be performed, the burst transmission may be switched to the real-time transmission in a case where it is determined that the vehicle arrived at the destination, the information indicating the start position or the parking position may be added, and the parking position may be transmitted at the time of performing re-activation.

It should be noted that, if the vehicle 60*b* has a function of positioning the positional information, rather than the positional information measured by the sensor unit 24, the positional information measured by the vehicle 60*b* may be transmitted to the map providing server 30 as the positional information 1211.

<Function Blocks of Map Providing Server 30>

Next, functional blocks provided of the map providing server 30 will be described with reference to a block diagram of FIG. 5.

Figure 5:
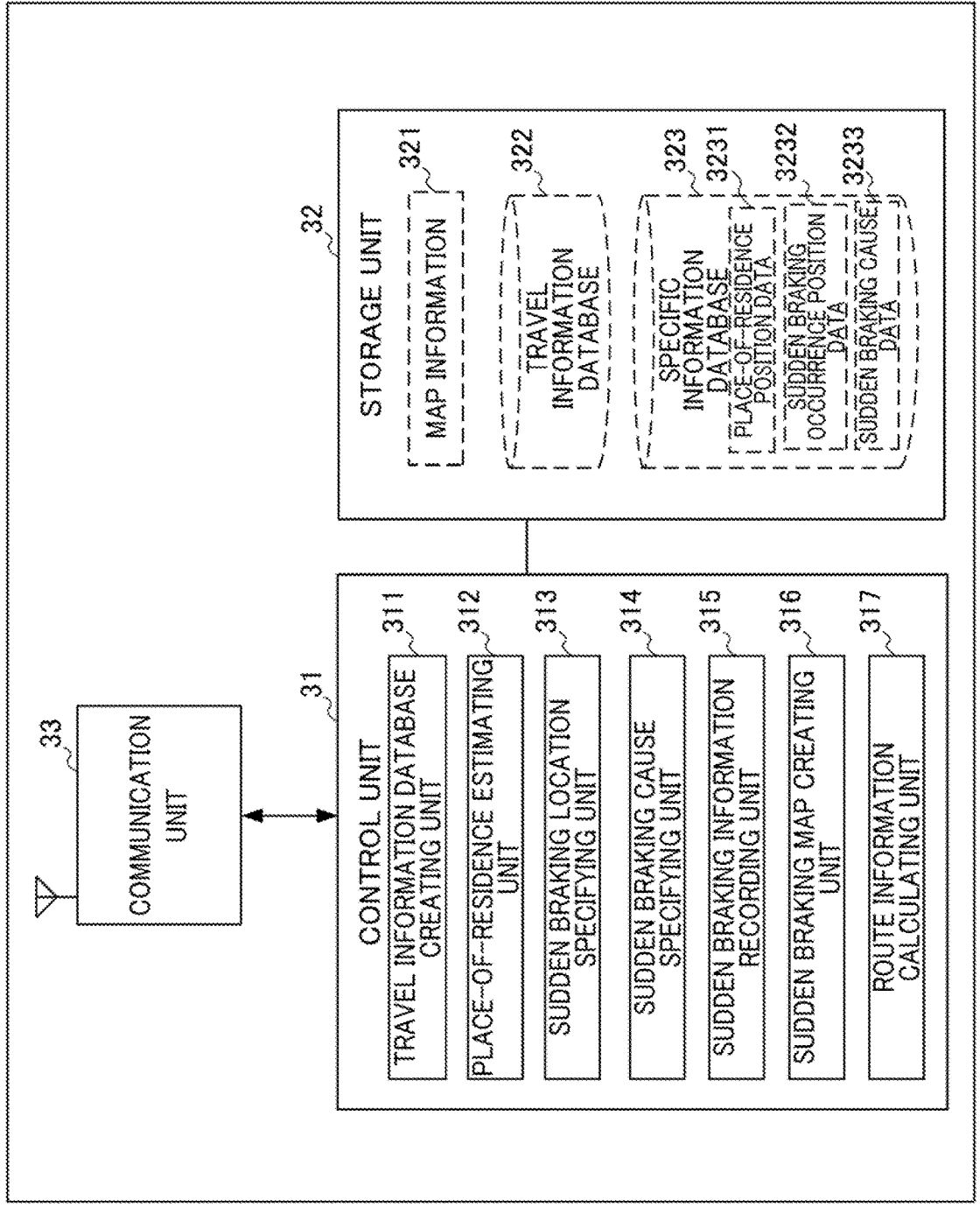
FIG. 5 is a functional block diagram showing a functional configuration of a map providing server according to an embodiment of the present invention.

As shown in FIG. 5, the map providing server 30 includes a control unit 31, a storage unit 32, and a communication unit 33.

The control unit 31 is configured by an arithmetic processing unit such as a microprocessor, and controls each unit constituting the map providing server 30. The details of the control unit 31 will be described below.

The storage unit 32 is configured by semiconductor memory or the like, and stores a control program called firmware or an operating system, each program such as a program for performing the map provision processing, and various information items such as the map information. In the drawings, the map information 321, the travel information database 322, and the specific information database 323 are illustrated as information stored in the storage unit 32, which are information particularly related to the analysis processing of the travel information.

The map information 321 includes information such as information relevant to a feature such as a road or a facility, road information, facility positional information, and parking lot information. In addition, the map information 321 includes display map data for displaying a background such as roads and road maps, positional information and type information of nodes (e.g., intersections of roads, bending points, end points, etc.), positional information and type information of links that are routes connecting between nodes, road network data including link cost data related to cost information of all links (e.g., distance, required time, etc.), and the like. So-called road map information, such as the classification of the roads and traffic lights, is stored as the road information.

In the facility positional information, the positional information of each facility is stored as latitude and longitude information. The facility location information may also include facility identification information (facility ID), name, category of facility (type of facility and/or genre of facility), and the like. In the parking lot information, positional information of the parking lot is stored as the latitude and longitude information. In a case in which the parking lot is a parking lot of each of the facilities, the facility and the parking lot are stored by being associated with each other.

The map information 321 may be configured by being stored in advance in the storage unit 32, or may be configured by being suitably downloaded from the server device (not illustrated) or the like that is connected to the communication network 50, as necessary. Furthermore, the map information 321 may be suitably corrected in accordance with the input of the user, or the like.

The travel information database 322 is a database constructed based on travel information (positional information and travel state information) and identification information received from each of the onboard navigation device 10 and the mobile terminal 20. The travel information database 322 is constructed by a travel information database creating unit 311 described later. The details of the travel information database 322 will be described later in the description of the travel information database creating unit 311. It should be noted that, in the following description, when the travel information 121 and the travel information 221 are described without being distinguished from each other, reference numerals are omitted and referred to as "travel information". In addition, similarly, in a case of not distinguishing the identification information 122 from the identification information 222, the reference numeral will be omitted, and the identification information 122 and the identification information 222 will be simply referred to as "identification information".

The specific information database 323 includes: place-of-residence position data 3231 in which the location of each moving body user's place of residence (e.g., home, workplace, school, etc.) specified by a place-of-residence estimating unit 312 described below is associated with each moving body ID; sudden braking occurrence position data 3232 in which, for each sudden braking occurrence location (location of occurrence) specified by a sudden braking location specifying unit 313 described later, the moving body ID of the moving body that was suddenly braked at this location is associated with the travel state data including the time of the sudden braking; and sudden braking cause data 3233 associated with local/non-local information indicating whether the sudden braking at the location of the braking (location of occurrence) is by local residents or by non-local residents, which is specified by a sudden braking cause specifying unit 314 described later.

The communication unit 33 includes a digital signal processor (DSP), and the like, and realizes wireless communication with the other device through the communication network 50 based on a standard such as 3rd generation (3G), long term evolution (LTE), or Wi-Fi (Registered Trademark). The communication unit 33 is used, for example, to receive travel information and identification information transmitted from the onboard navigation device 10 and the mobile terminal 20, respectively. Furthermore, the communication unit 33 is used, for example, to transmit the sudden braking occurrence location information to the onboard navigation device 10, the mobile terminal 20, and the user terminal 40. Here, the data which is transmitted and received between the communication unit 33 and the other device, is not particularly limited, and information other than the information described above may be transmitted and received.

Next, the details of the control unit 31 will be described. The control unit 31 is configured by a microprocessor including a central processing unit (CPU), random access memory (RAM), read only memory (ROM), an input/output (I/O), and the like. The CPU executes each program read from the ROM or the storage unit 32, reads the information from the RAM, the ROM, and the storage unit 32 when the program is executed, and writes the information with respect to the RAM and the storage unit 32, and thus, performs delivery of the signal with respect to the communication unit 33, the sensor unit 34, the display unit 35, and the input unit 36. Then, hardware and software (a program) cooperate with each other, and thus, the processing of this embodiment is realized. In this manner, the control unit 31 causes the map providing server 30 to function as a predetermined unit (hereinafter collectively referred to as a "map providing control unit") by executing each program. Furthermore, by executing each program, the control unit 31 causes the map providing server 30 to execute a predetermined step (hereinafter, collectively referred to as map providing control step). Hereinafter, functions of the control unit 31 will be described from the viewpoint of the map providing control unit. It should be noted that a description based on the viewpoint of the map providing control step (method) can be omitted because the description can be made by replacing "unit" with "step".

The control unit 31 includes, as functional blocks, a travel information database creating unit 311, a place-of-residence estimating unit 312, a sudden braking location specifying unit 313, a sudden braking cause specifying unit 314, a sudden braking information recording unit 315, a sudden braking map creating unit 316, and a route information calculating unit 317.

<Travel Information Database Creating Unit 311>

The travel information database creating unit 311 receives identification information, travel information, time information, and the like of the vehicle 60 from each vehicle 60 via the communication unit 33. Furthermore, the travel information database creating unit 311 constructs and updates the travel information database 322 as necessary based on the identification information, the travel information, the time information and the like, received from each vehicle 60. Before describing the travel information database creating unit 311, an example of a data structure of the travel information database 322 will be described. It should be noted that the travel state information exemplifies a state information related to sudden braking occurrence.

Regarding Travel Information Database 322

As shown in FIG. 6, the travel information database 322 includes "travel information" and "identification information" received from both the onboard navigation device 10 and the mobile terminal 20, as described above. More specifically, the "travel information" and "identification information" are stored in the travel history record (not shown) which manages travel information, time information, and the like periodically transmitted from when the ignition of the vehicle 60 is turned on until the ignition turned off (i.e., from start to arrival) for each identification information of the vehicle 60. In this way, the travel history record stores the information relating to the current position and the state information relating to the sudden braking occurrence which are sequentially received from the vehicle 60. It should be noted that the information may be received once every several seconds, or may be stored in a time series on the vehicle 60 side, and may be collectively received for a predetermined period of time, or at a certain timing when the application is started on the vehicle 60 side, or the like. It should be noted that the travel history record may be stored as a temporary record of the travel information database 322 if the arrival position is undefined during movement. It should also be noted that, regarding a departure facility ID corresponding to the departure position and a visiting facility ID corresponding to the arrival position, it is possible to specify the departure facility ID and the visiting facility ID by comparing the departure position and the arrival position with the facility information included in the map information based on the map information 321, the facility positional information, and the like of the storage unit 32. Furthermore, the state information related to the sudden braking occurrence (also referred to as "sudden braking information") is configured to include the position and time information indicating that the sudden braking occurrence was detected by the brake pedal sensor, the acceleration sensor, or the like, as described above. When the ignition of the vehicle is turned off, the travel history record is stored as a record of the travel information database including the visiting facility information by the visiting facility which is the arrival position being determined. The travel information database 322 includes the "departure position" and the "visiting facility" specified by the travel information database creating unit 311 based on the "travel information" received from each of the onboard navigation device 10 and the mobile terminal 20 as described above. As described above, the "visiting facility" includes undetermined data if the vehicle 60 is moving. Furthermore, the travel information database 322 includes sudden braking information generated during the movement. Furthermore, the travel information database creating unit 311 constructs and updates the travel information database 322 by storing information corresponding to the respective attributes in the fields.

Here, the "visiting facility" in the travel information database 322 is information for identifying a place where the user arrived by the vehicle 60 and stayed (for example, a facility, a work place, a school, or the like) except when the vehicle 60 is moving. When the ignition of the vehicle 60 is turned off, the travel information database creating unit 311 can specify the visiting facility based on the positional information received together with the identification information. For example, as described above, a case is considered in which information indicating a parking position is included in the positional information. In this case, the parking position is compared with the position of each facility (and the position of the parking lot linked to the facility) included in the map information 321, and when the specified parking position matches the position of any facility (and the position of the parking lot linked to the facility), it is determined that the user has arrived at the facility by the vehicle 60 and stayed. Then, the identification information (facility ID) of the facility included in the map information 321 is stored in the field of the visiting facility in the travel information database 322.

In a case of assuming that the positional information does not include the information indicating the parking position, for example, the position corresponding to the last received positional information between the start and the end of the transmission of the positional information or the position that does not change for a certain period of time may be regarded as the parking position, and the visiting facility may be specified by comparing the position with the position of each facility (and the position of the parking lot linked to the facility). Furthermore, in a case of assuming that the positional information does not include information indicating the parking position, for example, a facility set as a destination in route guidance can be specified as a visiting facility.

It should be noted that a "coincidence" degree of the above parking position and the position of the facility may be arbitrarily set. For example, in a case in which the onboard navigation device 10 or the mobile terminal 20 is capable of accurately measuring the positional information, a range determined as coincidence may be narrowed. On the other hand, in a case in which the onboard navigation device 10 or the mobile terminal 20 is not capable of accurately measuring the positional information, the range determined as coincidence may be widened. That is, even in a case in which the position is slightly shifted, it may be determined as coincidence.

The "identification information" in the travel information database 322 is, as described above, information for identifying the onboard navigation device 10 and the mobile terminal 20 which are the transmission sources of the travel information. That is, the "identification information" is information for identifying the vehicle 60 corresponding to the onboard navigation device 10 or the mobile terminal 20. The travel information database creating unit 311 stores the identification information received together with the travel information in the field.

The "departure position" in the travel information database 322 is a departure position in a travel route when the user moves to the visiting facility. The travel information database creating unit 311 specifies the departure position from the positional information received together with the identification information. For example, as described above, if information indicating the departure position is included in the positional information, the position of departing is specified by this information. In addition, in a case assuming that the information indicating the departure position is not included in the positional information, for example, it is possible to consider a position corresponding to the initially received positional information from the start to the end of the transmission of the positional information as the departure position. The travel information database creating unit 311 can specify whether or not the departure position is a facility (and a parking lot linked to the facility) included in the map information 321, based on the departure position thus specified.

Furthermore, the "positional information" in the travel information database 322 is all of the positional information that changes discretely in time from the departure position to the parking position in the travel route when the user visits the visiting facility. It should be noted that, in the "positional information" in the travel information database 322, the positional information from the first departure position to the visiting facility may be stored to be connected. The travel information database creating unit 311 stores all the travel information received during the period from the start of transmission of the travel information to the end thereof in the field.

The travel information database creating unit 311 updates the travel information database 322 based on the travel history record created based on the received travel information and identification information during the period from the start to the end of transmission of the travel information and identification information from any one of the onboard navigation device 10 and the mobile terminal 20.

<Place-Of-Residence Estimating Unit 312>

Next, the place-of-residence estimating unit 312 will be described. As described above, based on the identification information of the vehicle 60 received from the vehicle 60 which is travel, the place-of-residence estimating unit 312 estimates the position of a place of residence of the vehicle 60 (for example, the position of a home, a work place, or a school) by referring to the past travel history of the positional information in the travel information database 322. More specifically, based on the travel information database 322, for example, in a case in which the frequency at which the first departure position of each day in the past is at the same position is high, the place-of-residence estimating unit 312 can estimate the departure position as the home position of the user (except for the rental car facility). In addition, in a case in which the frequency of moving home after moving from home and staying at the same stop position for a long time on each day in the past (particularly on weekdays, etc.) is high, the stop position can be estimated to be the work place or school, etc. of the user by comparing the stop position with the map information. It should be noted that, as described above, the degree of "coincidence" of the same position may be arbitrarily determined. For example, in a case in which the onboard navigation device 10 or the mobile terminal 20 is capable of accurately measuring the positional information, a range determined as coincidence may be narrowed. On the other hand, in a case in which the onboard navigation device 10 or the mobile terminal 20 is not capable of accurately measuring the positional information, the range determined as coincidence may be widened. That is, it may be determined that the stop positions coincide even when the positions are slightly shifted. The place-of-residence estimating unit 312 can store, in the specific information database 323, the place-of-residence position data 3231 in which the position of the place of residence of the moving body user (e.g., home, work place, school, etc.) estimated for each moving body is linked to the moving body ID. It should be noted that, when it is determined that the departure position is the position of a rental car facility, it may be recorded as "rental car" because it is not the place of residence of the moving body user. In this case, the sudden braking cause specifying unit 314, which will be described later, may determine that the moving body user is a non-local resident. It should be noted that, since the moving body user may change the place of residence, it is preferable for the place-of-residence estimating unit 312 to perform generation and updating of the place-of-residence position data 3231 at a predetermined cycle. By referring to the place-of-residence position data 3231, for example, the sudden braking cause specifying unit 314 described later can easily determine whether the moving body user who has applied the sudden braking is a local resident or a non-local resident.

<Sudden Braking Location Specifying Unit 313>

The sudden braking location specifying unit 313 extracts all the sudden braking information generated within a predetermined period set in advance based on the travel history record recorded in the travel information database 322, and groups the extracted sudden braking information, for each occurrence place of sudden braking (occurrence position). More specifically, it is possible to store, in the specific information database 323, the sudden braking occurrence position data 3232 in which a set composed of travel state data including the moving body ID of the moving body that has applied sudden braking and the occurrence date and time (time information) of the sudden braking from the sudden braking information having the same location of the sudden braking occurrence of the sudden braking information is associated with the sudden braking occurrence location. Referring to the sudden braking occurrence position data 3232, by counting the sets of sudden braking information associated with the sudden braking occurrence location, for example, it is possible to specify a location having many times of occurrence or high occurrence frequency of the sudden braking among the sudden braking occurrence locations. Furthermore, in the sudden braking occurrence position data 3232, by referring to the moving body ID of the moving body that has applied sudden braking included in the sudden braking information associated with each sudden braking occurrence location based on the place-of-residence position data 3231, for example, the sudden braking information recording unit 315 to be described later can easily determine whether each sudden braking that occurred at the sudden braking occurrence location is caused mainly by local residents residing within the place-of-residence range, or by non-local residents residing outside the place-of-residence range.

<Sudden Braking Cause Specifying Unit 314>

The sudden braking cause specifying unit 314 determines whether the moving body user who has applied the sudden braking at the sudden braking occurrence location is a local resident or a non-local resident. More specifically, first, the sudden braking cause specifying unit 314 refers to the place-of-residence position data 3231, and acquires the position of a place of residence of each moving body user who has applied sudden braking at the sudden braking occurrence location. Next, the sudden braking cause specifying unit 314 determines whether the sudden braking occurrence location is located within the first predetermined range set in advance from the position of a place of residence of any moving body user, or is located outside the first predetermined range from any user's position of a place of residence of the moving body user. Here, the first predetermined range can be set to any size. For example, the range of the radius $N_1$ (kilometer) ($N_1$ is any positive value) with the position of a place of residence of the moving body user as a center can be the first predetermined range. Furthermore, rather than the radius, for example, the travel distance on the road from the position of a place of residence of the moving body user being the range of $N_1$ (kilometer) may be set as the first predetermined range. Furthermore, the first predetermined range may be determined based on the required movement time from, for example, the position of a place of residence of the moving body user to the sudden braking occurrence location. The size of the first predetermined range can be appropriately set. Thus, in a case in which it is determined that the sudden braking occurrence location is located within the first predetermined range set in advance from the position of a place of residence of any moving body user, the sudden braking cause specifying unit 314 determines that the sudden braking occurrence is caused by the local resident. Conversely, in a case in which it is determined that the sudden braking occurrence location is located outside the first predetermined range set in advance from the position of a place of residence of any moving body user, it can be determined that the sudden braking occurrence is caused by the non-local resident. As described above, when "rental car" is stored at the position of a place of residence, it may be determined as a non-local resident.

<Sudden Braking Information Recording Unit 315>

The sudden braking cause specifying unit 314 determines whether the sudden braking relating to each piece of braking information included in the sudden braking occurrence position data 3232 corresponding to the sudden braking occurrence location is caused by a local resident or a non-local resident, and then, the sudden braking information recording unit 315 adds the local/non-local information to each piece of sudden braking information indicating whether the sudden braking related to each piece of sudden braking information is caused by a local resident or a non-local resident. The sudden braking information recording unit 315 executes the processing for the sudden braking occurrence position data 3232 corresponding to all of the sudden braking occurrence locations. Thus, by referring to the sudden braking occurrence position data 3232 at all of the sudden braking occurrence locations, it is possible to determine whether each moving body user who has generated the sudden braking information is a local resident or a non-local resident. Next, the sudden braking information recording unit 315 aggregates all the sudden braking information included in the sudden braking occurrence position data 3232 corresponding to the respective sudden braking occurrence locations by grouping the local/non-local information separately, and thus, can record the sudden braking occurrence locations in the map information in association with the local/non-local information indicating whether the sudden braking occurring at each sudden braking occurrence location is caused by a local resident or a non-local resident, together with the number of sudden braking occurrences occurring at each sudden braking occurrence location. More specifically, the number of sudden braking caused at each sudden braking location and the ratio of the number of sudden braking caused by local residents and non-local residents may be recorded in association with the sudden braking location. In doing so, for example, the sudden braking information recording unit 315 may be configured such that, among the sudden braking occurring at each sudden braking occurrence location, if the ratio of the local resident exceeds a predetermined threshold value, for example, the sudden braking at the sudden braking occurrence location is assumed to be caused by the local residents, and conversely, if the ratio of the non-local resident exceeds a predetermined threshold value, the sudden braking at the sudden braking occurrence location is assumed to be caused by the non-local residents. It should be noted that, in a case in which the occurrence of the sudden braking is not biased toward either the local residents or the non-local residents, for example, "even" may be used for the local/non-local information. In addition, the sudden braking information recording unit 315 can associate the number of sudden braking occurrences and the local/non-local information based on the ratio of local residents to non-local residents of the number of sudden braking occurrences with the sudden braking occurrence locations, and record the resultant information in the map information 321. Furthermore, the sudden braking information recording unit 315 may record the number of sudden braking occurrences according to the time zone and the local/non-local information in the time zone in association with the sudden braking occurrence location based on the occurrence time information of the sudden braking. By doing so, for example, it is possible to analyze a location where sudden braking is likely to occur in a specific time zone.

<Sudden Braking Map Creating Unit 316>

In response to a map display request from a terminal connected to enable communication with the map providing server 30, the sudden braking map creating unit 316 arranges the sudden braking occurrence locations on the map as described above as shown in FIG. 3, for example, and provides the local/non-local information relating to the sudden braking occurrences to the terminal in a displayable manner in association with the sudden braking occurrence locations, based on the map information 321 in which the sudden braking information recording unit 315 associates the local/non-local information based on the ratio of local residents to non-local residents of the number of sudden braking occurrences with the sudden braking occurrence locations, and records the resulting information. Here, the terminal may be a user terminal 40, which will be described later, the onboard navigation device 10, or the mobile terminal 20. Furthermore, the sudden braking map creating unit 316 may determine whether the sudden braking occurrence locations are arranged on the map based on the number of occurrences of the sudden braking. For example, if the number of occurrences of the sudden braking exceeds a predetermined threshold value, the location may be arranged on the map as a sudden braking occurrence location. Furthermore, the predetermined threshold value may vary in accordance with the magnification of the map display requested from the terminal.

It should be noted that, in the above description, the sudden braking map creating unit 316 is configured to determine whether to arrange the sudden braking occurrence locations on the map based on the number of occurrences of sudden braking; however, the present invention is not limited thereto. For example, instead of the number of occurrences of sudden braking, it may be configured to determine whether to arrange the sudden braking occurrence locations on the map based on the occurrence frequency. More specifically, for example, in a case in which the occurrence frequency of the sudden braking obtained by dividing by the total number of vehicles 60 that have passed through a sudden braking occurrence location exceeds a predetermined threshold value set in advance, the location may be arranged on the map as the sudden braking occurrence location.

<Route Information Calculating Unit 317>

In response to a route guidance request from the onboard navigation device 10 or the mobile terminal 20, the route information calculating unit 317 may calculate route information that bypasses at least the sudden braking occurrence location where the sudden braking is caused mainly by non-local residents in a case in which the sudden braking occurrence location is located outside the first predetermined range from any user's position of a place of residence of the vehicle. Conversely, the route information calculating unit 317 may calculate at least route information that bypasses the sudden braking occurrence location where the sudden braking is caused mainly by local residents in a case in which the sudden braking occurrence location is located within the first predetermined range set in advance from the position of a place of residence of any user of the vehicle.

<Functional Block of User Terminal 40>

Figure 7:
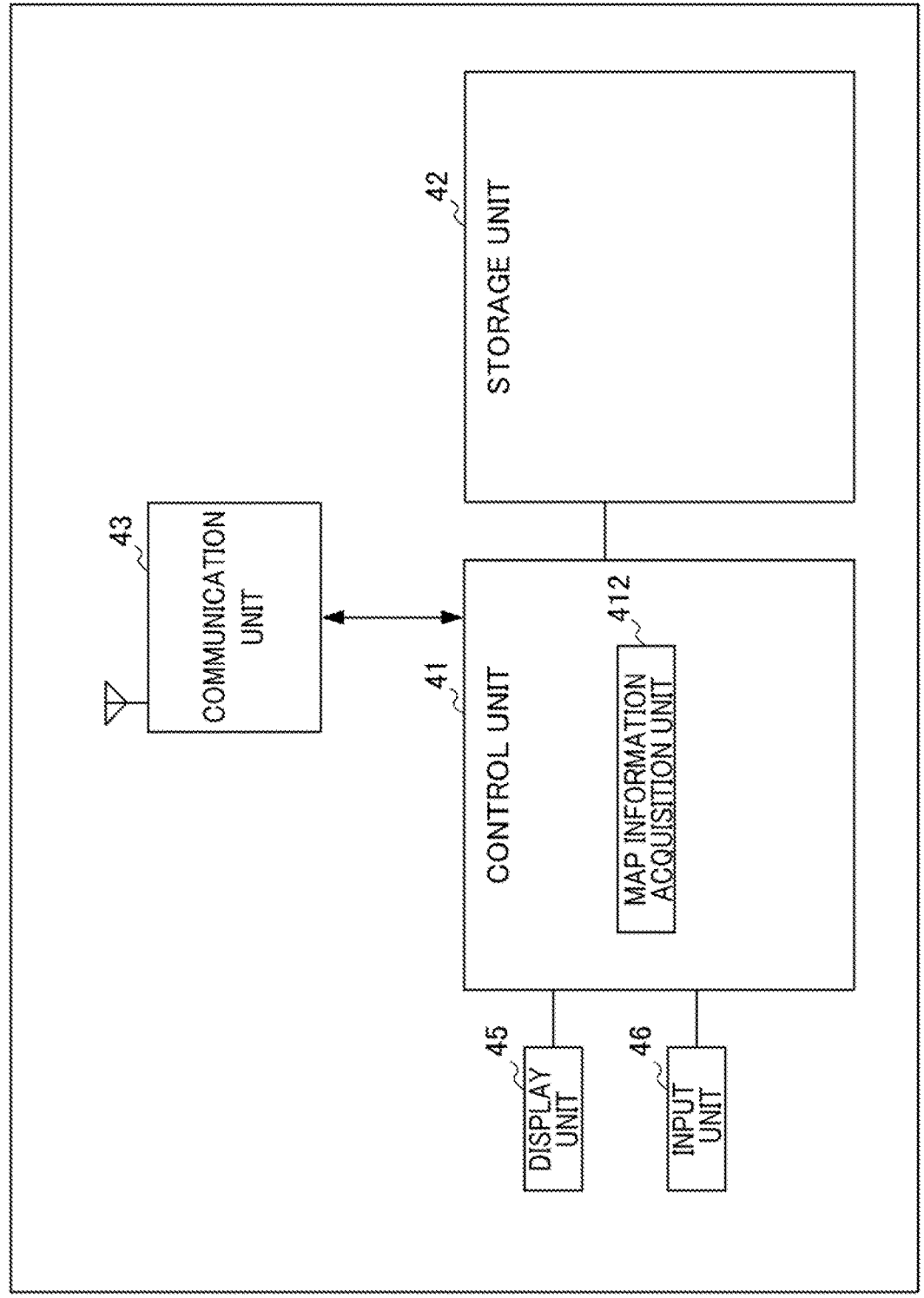
FIG. 7 is a functional block diagram showing the functional configuration of a user terminal according to an embodiment of the present invention.

The user terminal 40 can be realized by a general personal computer, and thus, a detailed description thereof will be omitted. As shown in FIG. 7, the user terminal 40 includes at least a control unit 41, a storage unit 42, a communication unit 43, a display unit 44, and an input unit 45. The configuration of each unit, for example, is identical to that of each unit having the same name as that of the onboard navigation device 10 or the mobile terminal 20.

The control unit 41 includes a map information acquisition unit 412. The map information acquisition unit 412 can acquire the map information in which the sudden braking occurrence location associated with the local/non-local information is arranged by requesting the map information in which the sudden braking occurrence location associated with the local/non-local information is arranged from the map providing server 30. As described above, the map information acquisition unit 412 can display the map information in which the sudden braking occurrence location associated with the acquired local/non-local information is arranged on the display unit 44, for example, as shown in FIG. 3.

Embodiments of the respective functional units of the map providing system 1 of the present invention have been described based on the configurations of the onboard navigation device 10, the mobile terminal 20, and the map providing server 30 mounted on the vehicle 60. It should be noted that the embodiments of the respective functional units included in the map providing server 30 of the present invention can be deployed so as to be executed in a single computer or in a large number of computers which are located in one place or distributed in several places and which are interconnected by a communication network in a distributed manner. It can also be configured using multiple virtual computers on a cloud.

Operation of the Present Embodiment

Figure 8:
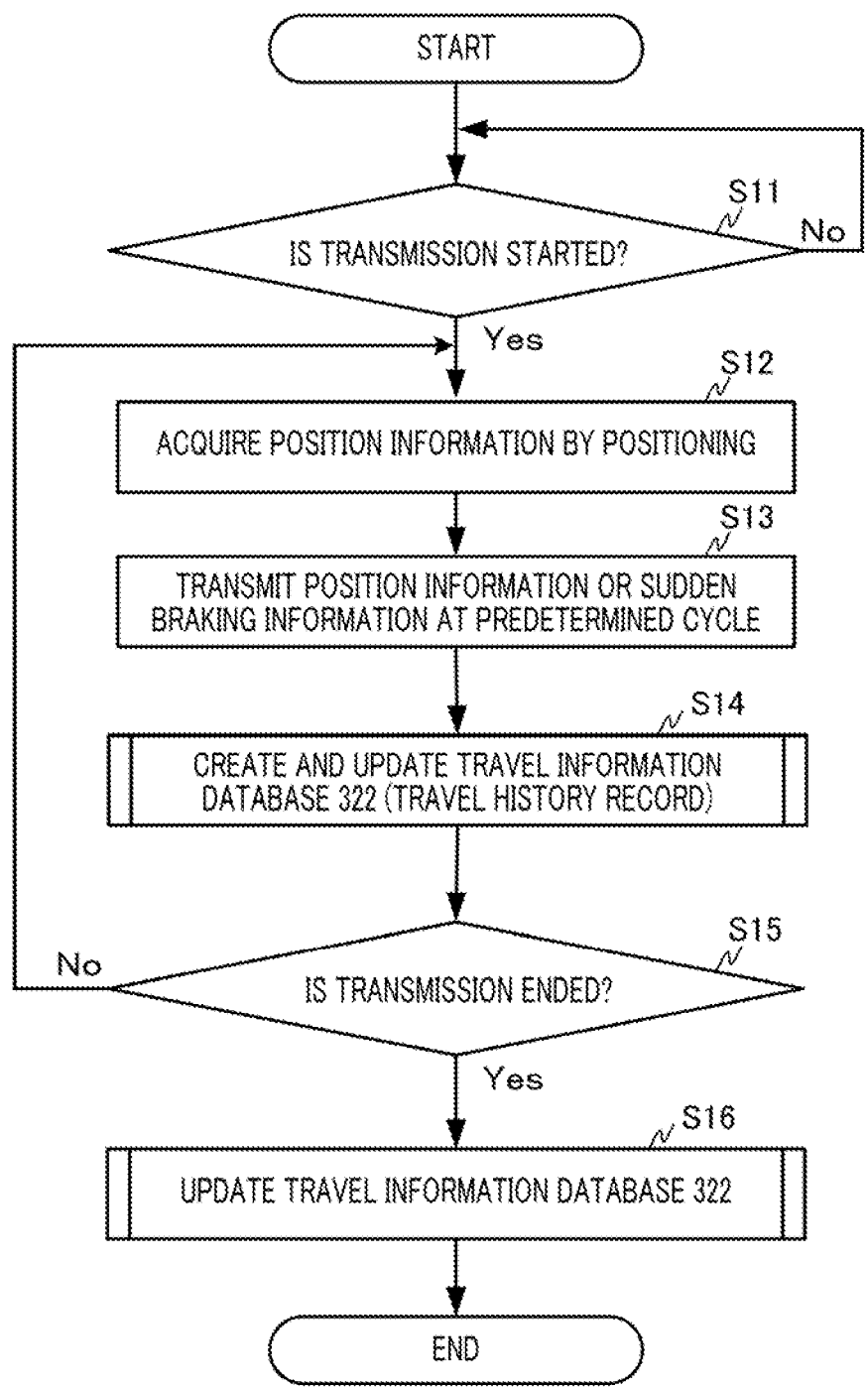
FIG. 8 is a flowchart showing a basic operation at the time of collecting positional information and updating a travel information database in an embodiment of the present invention.
Figure 9:
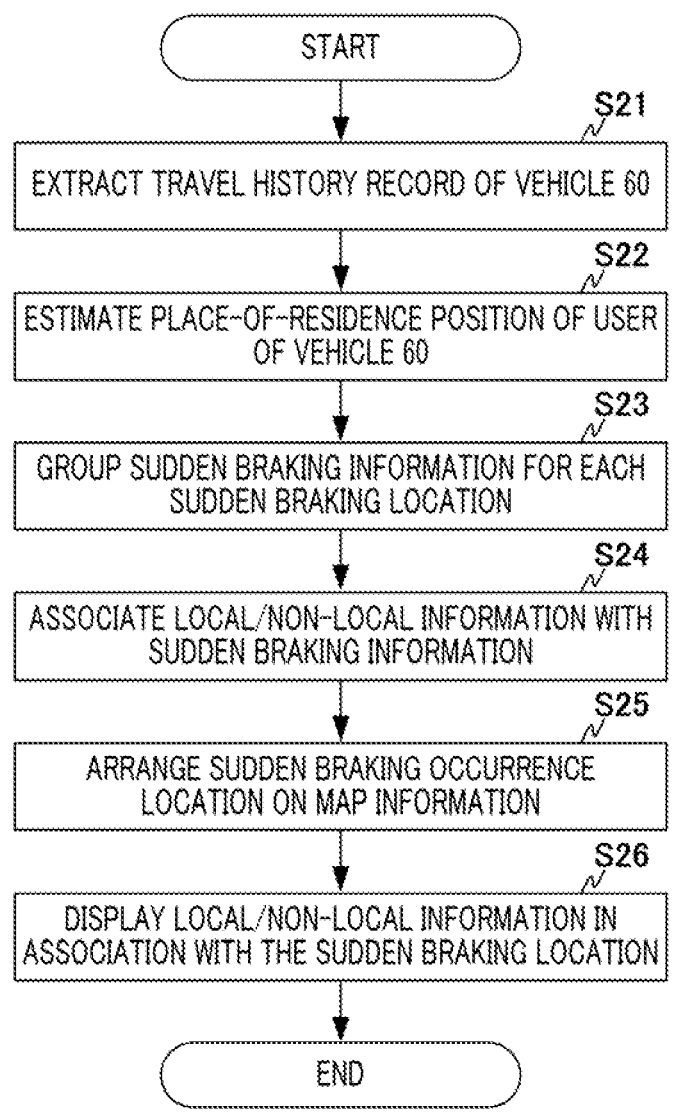
FIG. 9 is a flowchart showing operation at the time of creating map information arranged on a map by associating local/non-local information with sudden braking occurrence locations in an embodiment of the present invention.

Next, operation of the present embodiment will be described, with reference to flowcharts of FIG. 8 and FIG. 9. Here, FIG. 8 is a flowchart showing an operation at the time of collecting the travel information 121 and updating the travel information database 322. Furthermore, FIG. 9 is a flowchart showing operation at the time of creating map information in which the location where the sudden braking occurs is arranged on the map in association with the local/non-local information.

First, the operation at the time of collecting the travel information and creating and updating the travel information database 322 for the onboard navigation device 10 will be described with reference to FIG. 8. In Step S11, the travel information transmitting unit 111 determines whether to start the transmission of the travel information. Here, as described above, in a case in which the ignition switch of the vehicle 60a is turned on, the transmission is started. If the ignition switch remains off (NO in Step S11), transmission by the travel information transmitting unit 111 is not started. On the other hand, in a case in which the ignition switch is turned on (YES in Step S11), the processing advances to Step S12.

In Step S12, the sensor unit 14 acquires the positional information by measuring the position the onboard navigation device 10 (Step S12). The travel information transmitting unit 111 acquires positional information or sudden braking information (presence or absence of sudden braking information) from the sensor unit 14, and performs real-time transmission or burst transmission for the acquired positional information or sudden braking information to the map providing server 30 at a predetermined cycle (Step S13).

In Step S14, the travel information database creating unit 311 of the map providing server 30 creates and updates the travel history record in the travel information database 322 based on the travel information transmitted in Step S13.

Next, in Step S15, the travel information transmitting unit 111 determines whether to end the transmission of the positional information. As described above, in a case in which the ignition switch of the vehicle 60a is turned off, the transmission ends. In a case in which the ignition switch of the vehicle 60a remains on (NO in Step S15), the positioning in Step S12, the transmission in Step S13, and the creation and update of the travel history record in the travel information database 322 in Step S14 are repeated.

On the other hand, in a case in which the ignition switch of the vehicle 60a is turned off (YES in Step S15), the processing advances to Step S16.

In Step S16, the travel information database creating unit 311 of the map providing server 30 updates the travel information database 322 (visiting facility) by determining the arrival position (visiting facility) of the travel history record by ending the transmission of the travel information. By the operation described above, the collection of the travel information and the creation and update of the travel information database 322 are realized.

Next, operation at the time of collecting positional information and updating the travel information database 322 for the mobile terminal 20 will be described. With regard to the mobile terminal 20, in the above-described description, the travel information transmitting unit 111 may be replaced with the travel information transmitting unit 211, the sensor unit 14 may be replaced with the sensor unit 24, the reference for setting YES in Step S11 may be replaced with "in a case in which an activation switch of the vehicle 60b such as an ignition switch is turned on and the mobile terminal 20 is paired with the vehicle 60b", and the reference for setting YES in Step S14 may be replaced with "in a case in which the activation switch of the vehicle 60b such as an ignition switch is turned off and the pairing of the vehicle 60b and the mobile terminal 20 is cancelled". Therefore, the description for the redundant portions will be omitted.

Next, with reference to the flowchart of FIG. 9, the operation of the map providing server 30 at the time of creating and providing the map information in which the location where the sudden braking occurs is arranged on the map in association with the local/non-local information will be described. In Step S21, the control unit 31 extracts a travel history record of the vehicle 60 within a predetermined period set in advance from the travel information database 322 based on the identification information of the vehicle 60. Here, the predetermined period is inputted in advance.

In Step S22, the place-of-residence estimating unit 312 estimates the position of a place of residence of the user based on the travel history of the vehicle 60.

In Step S23, the sudden braking location specifying unit 313 extracts all the sudden braking information generated within a predetermined period set in advance based on the travel history record recorded in the travel information database 322, and creates the group (i.e., the sudden braking occurrence position data 3232) of the extracted sudden braking information, for each sudden braking occurrence location.

In Step S24, the sudden braking information recording unit 315 determines whether the sudden braking related to each piece of sudden braking information included in the group corresponding to the sudden braking occurrence location (the sudden braking occurrence position data 3232) is caused by a local resident or by a non-local resident, adds the local/non-local information to each sudden braking information, and records the sudden braking occurrence location in the map information. In Step S25, in response to the map display request from the terminal, the sudden braking map creating unit 316 arranges the sudden braking occurrence location recorded in the map information 321 associated with the local/non-local information on the map. In Step S26, the sudden braking map creating unit 316 provides the local/non-local information relating to the sudden braking occurrence to the terminal in association with the sudden braking occurrence location in a displayable manner.

As described above, it is possible to create and provide the map information in which the sudden braking occurrence location is arranged on the map in association with the local/non-local information.

According to the present embodiment described above, since what kind of vehicle is causing the sudden braking at the place where the sudden braking occurred, for example, whether by a local resident familiar with the town or by a non-local resident unfamiliar with the town, is stored in association with each other, it is possible to analyze the place where the sudden braking occurs from the viewpoint of a local resident or a non-local resident.

In addition, it is possible to easily understand from the terminal whether the sudden braking at the place where the sudden braking occurred is caused mainly by local residents or by non-local residents.

In addition, in a case in which the moving body user is a non-local resident, when the sudden braking is mainly caused by the non-local residents at the place where the sudden braking occurred, route guidance for bypassing the sudden braking can be provided to the non-local resident, and when the sudden braking is mainly caused by local residents at the place where the sudden braking occurred, route guidance for bypassing the sudden braking can be provided to the local resident. Therefore, it is possible to perform route guidance for avoiding the dangerous places regardless of whether the moving body user is a local resident or a non-local resident.

<Regarding Hardware and Software>

It should be noted that each device included in the navigation system described above can be realized by hardware, software, or a combination thereof. In addition, a navigation method performed by cooperation between the devices included in the navigation system described above can be realized by hardware, software, or a combination thereof. Here, the navigation method being realized by software indicates that a computer reads and executes a program, whereby the navigation method is realized.

The program can be stored by using various types of non-transitory computer readable media, and can be supplied to the computer. The non-transitory computer readable medium includes various types of tangible storage media. Examples of the non-transitory computer readable medium include a magnetic storage medium (for example, a flexible disk, a magnetic tape, and a hard disk drive), a magnetooptical storage medium (for example, a magnetooptical disk), CD-read only memory (ROM), CD-R, CD-R/W, and a semiconductor memory (for example, a mask ROM, a programmable ROM (PROM), an erasable PROM (EPROM), a flash ROM, and a random access memory (RAM)). In addition, the program may be supplied to the computer by various types of transitory computer readable media. Examples of the transitory computer readable medium include an electric signal, an optical signal, and an electromagnetic wave. The transitory computer readable medium is capable of supplying the program to the computer through a wired communication path such as an electric wire and an optical fiber, or a wireless communication path.

Modification Example

The embodiment described above is a preferred embodiment of the present invention; however, the scope of the present invention is not limited to the embodiment described above, and is capable of including embodiments in which various changes are conducted within a range not departing from the scope of the present invention.

For example, the functional configurations of FIGS. 2, 4, 5, and 7 are merely examples, and are not limiting the functional configurations of this embodiment. That is, it suffices if each device is provided with a function capable of executing a series of processes relating to the map providing function of the present invention as a whole, and what functional blocks are used for realizing this function is not particularly limited to the examples of FIGS. 2, 4, 5, and 7.

In addition, as another modification example, the onboard navigation device 10 or the mobile terminal 20 may be realized by other devices not having a route guidance function. That is, the route guidance function of the onboard navigation device 10 or the mobile terminal 20 is not a required component. In this case, the map providing server 30 may further include a route guidance function, and the map providing server 30 may perform route guidance by communicating with the onboard navigation device 10 and the mobile terminal 20.

Furthermore, as another modification example, in the above-described embodiment, the map providing server 30 is realized by a single server device or the like; however, it may be established as a distributed processing system that distributes each function of the map providing server 30 to a plurality of server devices as appropriate. In addition, a virtual server function or the like may be used on a cloud to realize each of the functions of the map provision server 30.

In the embodiment described above, the map providing server 30 includes the travel information database creating unit 311, and receives identification information, travel information, time information, and the like of the vehicle 60 from each vehicle 60 via the communication unit 33. Furthermore, the travel information database creating unit 311 has a configuration in which the travel information database 322 is constructed and appropriately created and updated based on the identification information, the travel information, and the time information received from each vehicle 60. On the other hand, an FCD (Floating Car Data) server (tentative name) may be provided separately from the map information providing server 30, and the FCD server may receive identification information, travel information, time information, and the like of the vehicle 60 from the respective vehicles 60. With such a configuration, the map information providing server 30 may acquire identification information, travel information, time information, and the like of each vehicle 60 from the FCD server. Furthermore, as another modification example, the FCD server may have a configuration in which the travel information database 322 is constructed, and appropriately created and updated based on the identification information, the travel information, and the time information received from each vehicle 60. In this case, the map providing server 30 may appropriately acquire the information stored in the travel information database 322 from the FCD server.

EXPLANATION OF REFERENCE NUMERALS 1 map providing system
10 onboard navigation device
20 mobile terminal
11, 21 control unit
111, 211 travel information transmitting unit
112, 212 map information acquisition unit
113, 213 route guidance unit
12, 22, 32 storage unit
121, 221 travel information
1211, 2211 positional information
1212, 2212 travel state information
122, 222 identification information
13, 23, 33 communication unit
14, 24 sensor unit
15, 25 display unit
16, 26 input unit
27 near field communication unit
30 map providing server
31 control unit
311 travel information database creating unit
312 place-of-residence estimating unit
313 sudden braking location specifying unit
314 sudden braking cause specifying unit
315 sudden braking information recording unit
316 sudden braking map creating unit
317 route information calculating unit
32 storage unit
321 map information
322 travel information database 323 specific information database
3231 place-of-residence position data
3232 sudden braking occurrence position data
3233 sudden braking cause data
40 user terminal 40
50 communication network
60, 60a, 60b vehicle

The invention claimed is:

1. A map providing server comprising:
a receiving unit that receives positional information and information relating to braking of a moving body;
a map information storage unit that stores map information storing information of roads on which the moving body can travel;
a place of residence estimating unit that estimates a position of a place of residence including any one of a home, a workplace, and a school of a user of the moving body based on an estimation of the positional information of the moving body;
a sudden braking location specifying unit that specifies a sudden braking occurrence of the moving body and an occurrence location of the sudden braking based on the information of the receiving unit;
a sudden braking cause specifying unit that determines whether the occurrence location of the sudden braking is located within a predetermined range set in advance from the position of the place of residence of the user of the moving body, or located outside the predetermined range; and
a sudden braking information recording unit that records the occurrence location of the sudden braking in the map information in association with local/non-local information indicating whether the position of the place of residence of the user of the moving body specified by the sudden braking cause specifying unit is located within the predetermined range or located outside the predetermined range.

2. The map providing server according to claim 1, further comprising a map creating unit that, in response to a map display request from a terminal connected to enable communication with the map providing server, arranges the occurrence location of the sudden braking on a map, and provides the local/non-local information to the terminal in a displayable manner in association with the occurrence location of the sudden braking.

3. The map providing server according to claim 1, further comprising a route information calculating unit that, in response to a route guidance request from the moving body, calculates route information that bypasses the occurrence location of the sudden braking based on whether the position of the user of the place of residence of the moving body is located within the predetermined range of the occurrence location of the sudden braking recorded in the map information by the sudden braking information recording unit, or located outside the predetermined range.

4. A map providing method performed by one or more computers including a map information storage unit that stores map information storing information of roads on which a moving body can travel, the method comprising the steps of:
receiving positional information and information relating to braking of the moving body;
estimating a position of a place of residence including one of a home, a workplace, and a school of a user of the moving body based on an estimation of the positional information of the moving body;
specifying a sudden braking occurrence of the moving body and an occurrence location of the sudden braking based on the information received in the step of receiving;
determining whether the occurrence location of the sudden braking is located within a predetermined range set in advance from the position of the place of residence of the user of the moving body, or located outside the predetermined range; and
recording the occurrence location of the sudden braking in the map information in association with information indicating whether the position of the place of residence of the user of the moving body specified in the step of determining is located within the predetermined range or located outside the predetermined range.

5. The map providing server according to claim 2, further comprising a route information calculating unit that, in response to a route guidance request from the moving body, calculates route information that bypasses the occurrence location of the sudden braking based on whether the position of the user of the place of residence of the moving body is located within the predetermined range of the occurrence location of the sudden braking recorded in the map information by the sudden braking information recording unit, or located outside the predetermined range.

* * * * *